(12) United States Patent
Bauchot et al.

(10) Patent No.: US 8,019,279 B2
(45) Date of Patent: Sep. 13, 2011

(54) SYSTEM AND METHOD FOR USING MOBILE PHONES AS HANDSETS FOR IP SOFTPHONES

(75) Inventors: Frederic Bauchot, Saint-Jeannet (FR); Stephane Lebrun, Biot (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 11/543,641

(22) Filed: Oct. 5, 2006

(65) Prior Publication Data

US 2007/0091833 A1 Apr. 26, 2007

(30) Foreign Application Priority Data

Oct. 25, 2005 (EP) .................................. 05300853

(51) Int. Cl.
*H04B 7/00* (2006.01)
(52) U.S. Cl. .................... 455/41.2; 455/556.1; 455/557; 455/466; 455/433; 370/352; 370/382; 370/259; 709/235; 726/20
(58) Field of Classification Search .................. 455/41.2, 455/466, 433, 556.1, 557, 414.1; 370/352, 370/382, 259, 383; 726/20, 3; 709/235; 379/265.02
See application file for complete search history.

(56) References Cited

U.S. PATENT DOCUMENTS

| | | | | |
|---|---|---|---|---|
| 6,563,814 B2* | 5/2003 | Rowan et al. | | 370/352 |
| 6,650,848 B1* | 11/2003 | Regelsberger et al. | | 399/49 |
| 6,744,877 B1* | 6/2004 | Edwards | | 379/265.02 |
| 7,295,669 B1* | 11/2007 | Denton et al. | | 379/265.02 |
| 7,336,654 B2* | 2/2008 | Barkley et al. | | 370/352 |
| 7,453,993 B2* | 11/2008 | Watts et al. | | 379/88.17 |
| 2003/0039242 A1 | 2/2003 | Moore, Jr. | | 370/354 |
| 2003/0235186 A1 | 12/2003 | Park | | |
| 2004/0072593 A1 | 4/2004 | Robbins et al. | | 455/560 |
| 2004/0266426 A1 | 12/2004 | Marsh et al. | | 455/426.2 |
| 2005/0277406 A1* | 12/2005 | Diroo et al. | | 455/412.2 |
| 2005/0277431 A1* | 12/2005 | White | | 455/466 |
| 2006/0116113 A1* | 6/2006 | Gass | | 455/414.4 |
| 2006/0187900 A1* | 8/2006 | Akbar | | 370/352 |
| 2006/0193301 A1* | 8/2006 | Cheng et al. | | 370/338 |
| 2006/0227760 A1* | 10/2006 | Elbæk et al. | | 370/352 |
| 2006/0245578 A1* | 11/2006 | Bienfait et al. | | 379/265.02 |
| 2006/0245579 A1* | 11/2006 | Bienfait et al. | | 379/265.02 |
| 2007/0047522 A1* | 3/2007 | Jefferson et al. | | 370/352 |
| 2007/0167167 A1* | 7/2007 | Jiang | | 455/453 |
| 2009/0129371 A1* | 5/2009 | Bishay | | 370/352 |

FOREIGN PATENT DOCUMENTS

| | | |
|---|---|---|
| CN | 1622486 A | 6/2005 |
| EP | 1 257 132 A1 | 5/2001 |
| JP | 2001-352349 | 12/2001 |
| WO | WO 98/53371 | 11/1998 |

OTHER PUBLICATIONS http://www.skype.com/products, "Make Cheap International Calls with SkypeOut", 2 pgs.

* cited by examiner

*Primary Examiner* — Marceau Milord
(74) *Attorney, Agent, or Firm* — George R. McGuire; Blaine T. Bettinger; Bond Schoeneck & King

(57) ABSTRACT

The present invention is directed to a method, system and computer program for using a mobile phone as handset for an Internet Protocol (IP) softphone and for automatically transferring calls from an IP softphone running on a workstation to another IP softphone running on another workstation.

30 Claims, 2 Drawing Sheets

SYSTEM AND METHOD FOR USING MOBILE PHONES AS HANDSETS FOR IP SOFTPHONES

FIELD OF THE INVENTION

The present invention relates to voice communications over Internet and more particularly to a method and system for using mobile phones as handsets for Internet Protocol (IP) softphones and to provide softphones with an automatic phone call transfer function.

BACKGROUND OF THE INVENTION

Today, mobile phones are used by a large majority of people. They bring comfort and suppleness, and their functions and possibilities are increasing every day. We "wear" them with us all the day long. Another type of phone has appeared in the Internet world: the softphones, working on traditional workstations. These software based phones can be freely downloaded from the Internet, and allow each user connected to the web with it's workstation to call another user connected to the same softphone provider, or to traditional or IP phones. "Skype" for example is a well known company offering this kind of solution (http://www.skype.com/products/). The user audio interface of softphones is composed of two parts:
  a microphone, and
  a loudspeaker,
both included in the workstation of the user. The user can also use a headset connected to the computer. In addition, conventional means such as the keyboard or a touch screen are used to interface the softphone for dialing or accessing some basic telephony functions (on-hold, call transfer, conferencing, etc . . . ). When the workstation is used as a telephone, the user has to speak in a built-in microphone of the laptop or computer, and listen through the built-in loudspeaker. Depending on the workstation, the quality of the microphone and loudspeaker may be variable. In any case, the user must stay close to the computer to use it as a phone.

An object of the present invention is to replace the microphone and loudspeaker of the workstation by a real handset, which will be the mobile phone (e.g. a Global System for Mobile/General Packet Radio Service/Universal Mobile Telecommunications Systems (GSM/GPRS/UMTS) mobile phone). For this purpose, a short range wireless technology, such as the "Bluetooth" technology, can be used between the computer executing the softphone application and the mobile phone.

Another object of the present invention is to give the softphone application the possibility to "follow" the user with its mobile phone, going from a first workstation to another one by automatically activating a call transfer. The user is no longer required to stay seated close to the computer, but is able to move and to join any other computer running the softphone application.

OBJECTS OF THE INVENTION

An object of the present invention is to use the loudspeaker, the microphone and the keypad of a mobile phone to interface with a workstation.

Another object of the present invention is to use a short range wireless communication means between a mobile phone and a workstation.

Yet another object of the present invention is to automatically activate a call transfer function, when the mobile phone is no longer detected by the computer hosting the softphone application.

A further object of the present invention is to place the softphone of the workstation in a call transfer mode, when the mobile phone is no longer detected by the computer hosting the softphone application.

A further object of the invention is to associate the phone number of the user's softphone to the user's mobile phone.

A further object of the present invention is, as soon as the computer hosting a softphone application has detected the presence of the mobile phone, to add the phone number associated with the mobile phone to the list of phone numbers associated with the softphone.

A further object of the present invention is to use the phone number associated with the mobile phone of the softphone to which the mobile phone is connected.

SUMMARY OF THE INVENTION

The present invention is directed to a method, system and computer program as defined in independent claims, for using a mobile phone as handset for an Internet Protocol (IP) softphone and for automatically transferring calls from an IP softphone running on a workstation to another IP softphone running on another workstation.

The method for use in a mobile phone comprises the steps of:
  establishing a direct, local wireless connection with a softphone, the mobile phone and the softphone comprising wireless means to communicate directly and locally together without using services of a wireless network, the mobile phone acting as a handset for the softphone using the established wireless connection.

The method to use in a softphone, for using a mobile phone as a handset, comprises the steps of:
  establishing a direct, local wireless connection with a mobile phone, the mobile phone and the softphone comprising wireless means to communicate directly and locally together; and
  using the mobile phone as handset using the established wireless connection.

Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The preferred mode of use, further objects and advantages of the invention, will best be understood by reference to the following detailed description of an illustrative detailed embodiment when read in conjunction with the accompanying drawings, wherein.

PREFERRED EMBODIMENT OF THE INVENTION

The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment described but is to be accorded the widest scope consistent with the principles and features described herein.

Principles of the Invention

The present invention includes a method and system aimed to use a standard mobile phone as handset for a softphone application, and includes a method and system aimed to provide softphone applications with a function of automatic call transfer. The present invention takes advantage of well know technologies and products, such as mobile phones, softphones, Bluetooth, etc.

Mobile Phone Used as Handset for a Softphone Application

Figure 1:
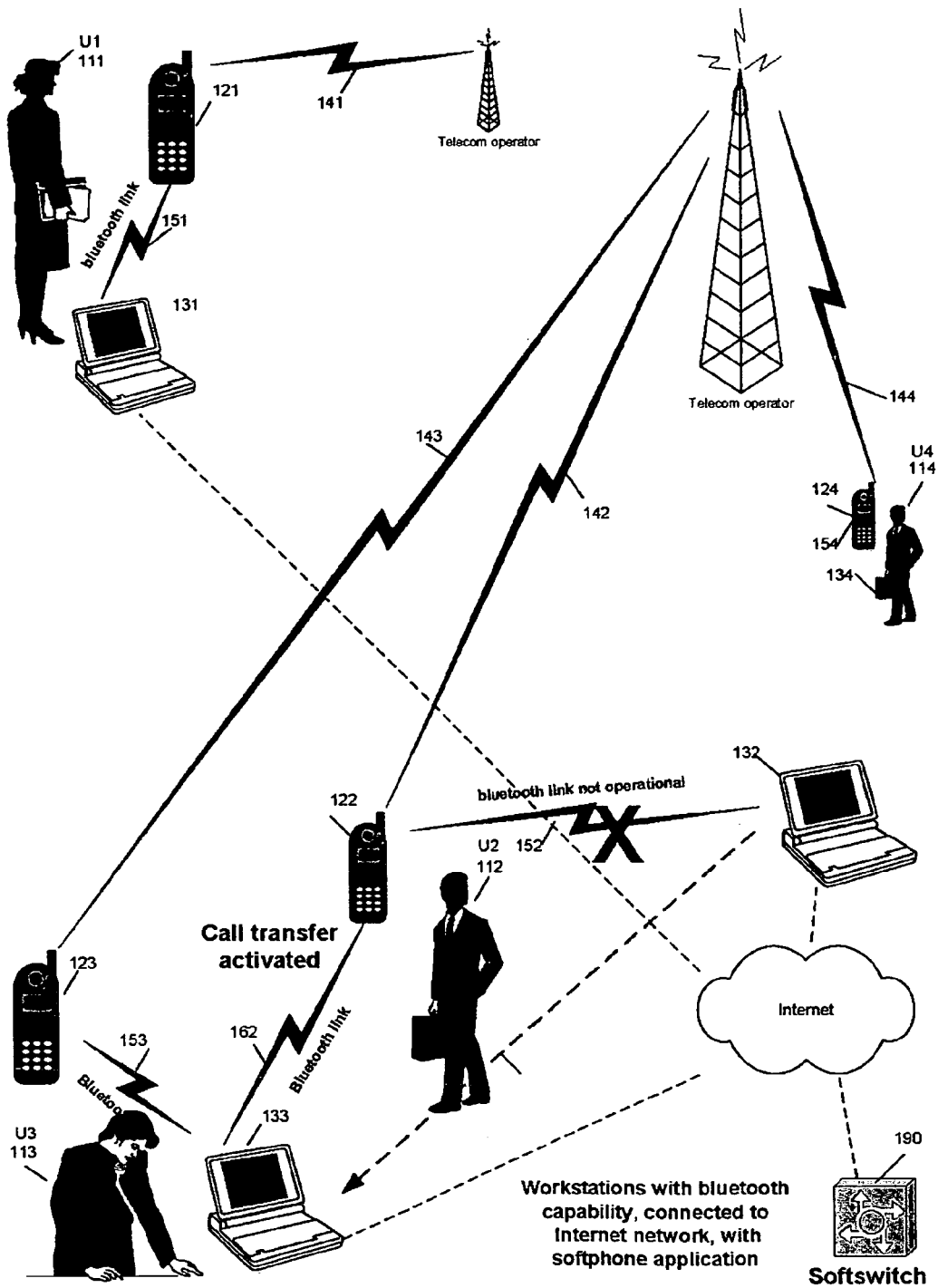
FIG. 1 shows an example where a mobile phone is used as handset for a softphone.

FIG. 1 shows an example of a mobile phone used as handset for an IP softphone. The mobile phone comprises means:

for directly communicating with the IP softphone via a short range wireless link; and for storing the phone number of a user's IP softphone (also called "home" IP softphone) running on the user's workstation.

The IP softphone comprises means for automatically transferring calls from an IP softphone running on a workstation to another IP softphone running on another workstation in a different place.

Most modem workstations running softphone applications are equipped with the Bluetooth technology in order to phone in a more comfortable and convenient way using wireless headsets. The present invention can use the "Bluetooth" wireless technology—with a specific channel between the mobile phone and the user workstation—to connect a mobile phone to any physically close computer. The mobile phone can itself be used as a headset for the softphone application running on the computer. When the user is close enough to his/her computer, a Bluetooth link is automatically established between the computer running the softphone application and the mobile phone. At the reception of a call, the mobile phone will be used as a headset for the softphone application.

If the mobile phone is already equipped with a personal headset, 2 specific wireless channels are set up:

A first wireless channel between the mobile phone and the workstation,

A second wireless channel between the mobile phone and its own headset.

The headset will be used for both kinds of communications:

standard GSM/GPRS phone communications, and softphone communications.

Automatic Phone Call Transfer

Once a connection is established between the workstation running the softphone application and the mobile phone, the user may have to move from one desk to another place in the enterprise premises. An automatic call transfer function may be activated as soon as the Bluetooth signal is lost between the computer and the mobile phone. In the present invention, it is assumed that the softswitch managing the IP softphone, supports the call transfer function.

According to the user choice, when the mobile phone is not detected by the IP softphone or is no longer connected to this IP softphone:

Incoming calls are recorded in a specific voice mail as long as the user is not available, or Incoming calls continue to be directed to the user IP softphone (the user continues to use the loudspeaker and the microphone of the computer hosting the IP softphone).

Incoming calls are diverted to another IP softphone.

When the user's mobile phone arrives within range of another computer:

A short range wireless connection is established with another IP softphone application running in the other computer.

The user phone number associated with the user's mobile phone is transferred to the other new IP softphone.

The user phone number is forwarded by the IP softphone to the softswitch in order to inform it that a new user phone number is associated with the IP softphone.

Incoming calls for the user are received by the new IP softphone and the user's mobile phone is used as handset.

Outgoing calls requested by the user using its mobile phone as handset are set up by the IP softphone.

This scenario is repeated each time a user with his/her mobile phone leaves a workstation running an IP softphone application and arrives within range of another workstation running an IP softphone application. The present method does not constitute a complex roaming infrastructure, but provides a similar comfort.

Preferred Embodiment

FIG. 1 shows an example where a mobile phone is used as handset for an IP softphone running on workstation. The IP softphone comprises an automatic call transfer function from an IP softphone running on a workstation to another IP softphone running on another workstation in a different place.

Users U1 111, U2 112, U3 113 and U4 114 are all working in the same company, campus, or area, and are often meeting together in different places and are equipped with mobile phones 121, 122, 123, 124 respectively. The mobile phones are connected to a telecom company for standard use. The GSM/GPRS/UMTS links to the telecom company are represented by links 141, 142, 143, and 144.

Users U1 111, U2 112, U3 113 and U4 114, are also equipped with workstations 131, 132, 133, 134 respectively. (Workstation 134 is in the present example in a shutdown state). The workstations are connected to the Internet Network, and each workstation is running a piece of software called "softphone". IP softphone applications communicate on the Internet network with IP datagrams. The softphone client part runs on workstations, herein called "softphone", and a server part runs on a softswitch device 190. A softswitch is a central application located on a device (server) for managing the softphones.

The workstations hosting the softphone applications and the mobile phones are equipped with a short range wireless communications capability, such as Bluetooth. The wireless links established between mobile phones 121, 122, 123 and workstations 131, 132, 133 are represented by links 151, 152, and 153.

Three different types of links are involved in this example:

GSM/GPRS/UMTS links between mobile phones and their telecom operator;

Bluetooth links between mobile phones and workstations;

IP data links on the Internet, between workstations and the softswitch.

Example of Mobile Phone Used as Handset for a Softphone Application

Outside the campus, user U4 114 uses mobile phone 124 with standard GSM connection 144 with the telecom provider. In that case a short range wireless communication link 154 is enabled, but not operational. Working at their workstations, users U1 111 and U3 113 have their respective mobiles phones 121 and 123 connected to respective workstations 131 and 133 with Bluetooth links 151 and 153. Standard GSM links 141 and 143 are also operational. In this configuration, users U1 111 and U3 113 can use softphone applications associated with mobile phones 121 and 123. The mobile phones are connected to their respective workstations through wireless links (e.g. Bluetooth links) and are used as handsets.

Example of Automatic Phone Call Transfer

When user U2 112 leaves workstation 132 with mobile phone 122, short range wireless communication connection 152 is lost. The IP softphone running on workstation 132 also detects the loss of communication and sets the user number associated with the mobile phone in transfer mode. Any new incoming call for this number is then automatically transferred (forwarded) to a voice mail. User U2 112, after having left workstation 132, arrives near user U3 113, and U3 workstation 133. When user U2 112 is within the receiving area of workstation 133, then a short range wireless communication link 162 is activated between mobile phone 122 and workstation 133, on a different channel than regular link 153.

The phone number associated with the mobile phone of user U2 112 is automatically transferred (forwarded) from the initial destination (which may be either the voice mail server or the softphone running on user workstation 132) to the new destination (the softphone running on workstation 133). User U2 112 connected to user U3 workstation 133, can now use the softphone application running on this workstation.

Method for Exchanging Messages Between Mobile Phones and Softphones

Figure 2:
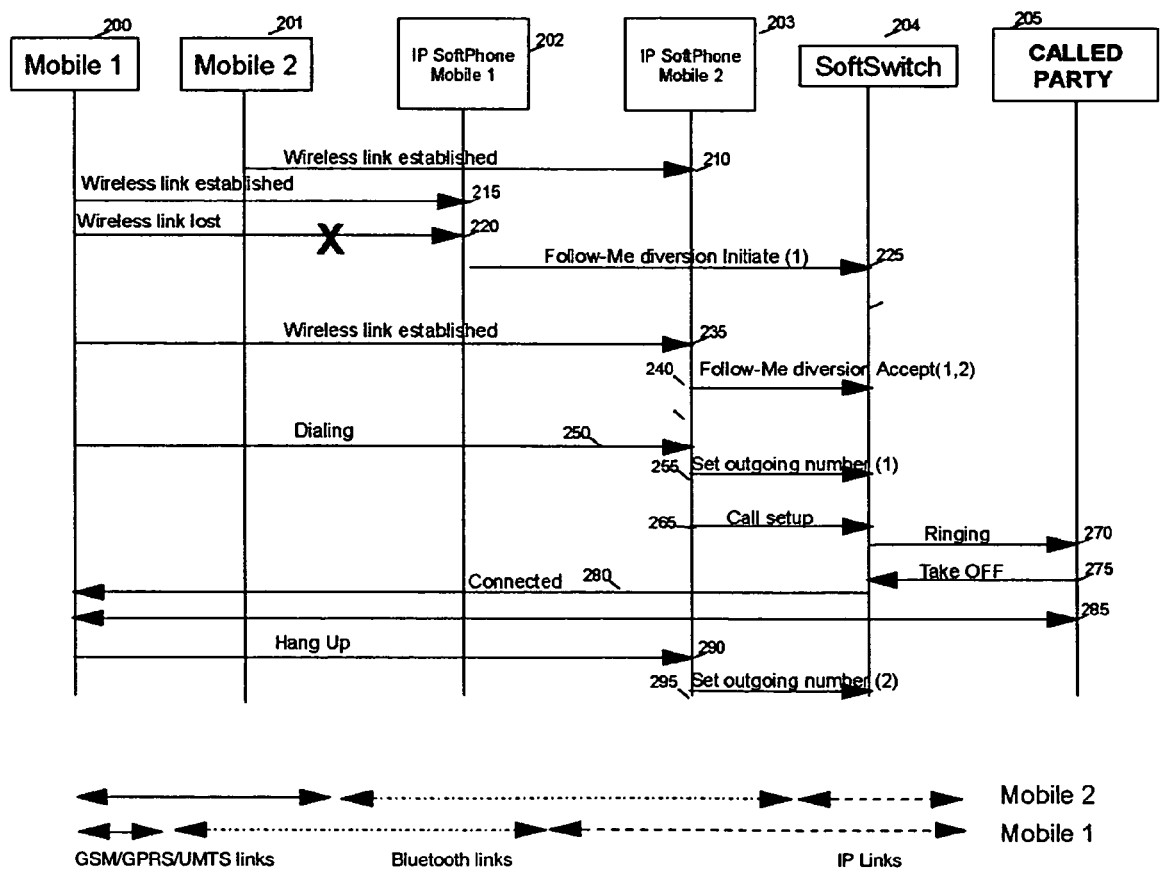
FIG. 2 shows messages exchanged between mobile phones, IP softphones and a softswitch according to the present invention.

In the example illustrated in FIG. 2, there are 2 mobile phones: Mobile 1 200 and Mobile 2 201. Each mobile phone 200 and 201 is configured with an extension number associated with the home IP softphone 202 and 203.

At step 210, a short range (local) wireless link is established between Mobile 2 201 and home IP softphone 203.

At step 215, a short range (local) wireless link is established between Mobile 1 200 and home IP softphone 202.

At step 220, the user, owner of the Mobile 1 200, moves and loses the wireless connection between Mobile 1 and home IP softphone 202.

At step 225, IP softphone 202 associated with Mobile 1 200 detects the loss of wireless connection and sends a "Follow-Me Diversion Initiate" message 225 to a softswitch 204. The "Follow-Me Diversion Initiate" message sets the number of home IP softphone 202 in transfer mode. Any call received for IP softphone 202 phone number is directed:
  either to the home IP softphone;
  or to the voicemail server if a voice mail box has been defined for this phone number;
  or to a given default IP softphone.

At step 235, a short range wireless connection is established between Mobile 1 200 and IP softphone of Mobile 2 203. Mobile 1 200 transmits the number of home IP softphone 202 to IP softphone 203.

At step 240, IP softphone of Mobile 2 203 sends to softswitch 204 a "Follow-Me Diversion Accept" message 240 comprising:

means for identifying home IP softphone 203 of Mobile 2 (preferably its IP softphone number); and
  the number of home IP softphone 202 associated with Mobile 1 200.

Call Process

At step 250, Mobile 1 200 sends a Dialing message to IP softphone 203 of Mobile 2 to call someone. The Dialing message comprises the number of home IP softphone 202 of Mobile 1 200 and the phone number of the called party.

At step 255, upon receipt of the Dialing message, IP softphone 203 of Mobile 2 asks softswitch 204 to replace the phone number of IP softphone 203 with the phone number of the Mobile 1 200. This is necessary to present the number of the Mobile 1 200 to the called party.

At step 265, a Call Set Up message is sent by softphone 203 of Mobile 2 to softswitch 204.

At step 270, the phone corresponding to a called party 205 is ringing

At step 275, called party 205 sends back a Take Off message to softswitch 204 and the communication is established at step 280.

At step 285, Mobile 1 200 and called party 205 are in communication.

At step 290, calling party Mobile 1 200 or called party 205 hangs up to terminate the call.

At step 295, IP softphone 203 which handled the communication requests softswitch 204 to replace the phone number of Mobile 1 with the native number of IP softphone 203. This is necessary to go back to the initial configuration.

Advantages Of The Present Invention

An advantage of the present invention is that it is based on conventional mobile phones on which additional local wireless communication means have been installed.

A further advantage of the present invention is that the transfer of calls from an IP softphone to another IP softphone is automatic and completely transparent for the user of the mobile phone.

Another advantage of the present invention is that it utilizes a conventional softswitch. To transfer calls, the softswitch doesn't need to be configured or to be modified in any way, neither hardware nor software. The transfers of calls between softphones utilize standard functions. Softphone applications have to be slightly modified to implement the present invention, more particularly to recognize mobile phones as handsets and to dynamically transfer a user phone number (initialization and acceptation) from one softphone to another softphone.

Bluetooth wireless technology

Bluetooth wireless technology is a short-range radio technology. Bluetooth wireless technology makes it possible to transmit signals over short distances between telephones, computers and other devices and thereby simplifies communication and synchronization between devices. It is a global standard that:
  eliminates wires and cables between both stationary and mobile devices
  facilitates both data and voice communication
  offers the possibility of ad-hoc networks and delivers the ultimate synchronicity between all your personal devices The Bluetooth wireless technology comprises hardware, software and interoperability requirements. Beyond unleashing devices by replacing cables, Bluetooth wireless technology provides a universal bridge to existing data networks, a peripheral interface, and a mechanism to form small private ad-hoc groupings of connected devices away from fixed network infrastructures. Bluetooth radio uses a fast acknowledgement and frequency-hopping scheme to make the link robust, even in noisy radio environments.

While the invention has been particularly shown and described with reference to a preferred embodiment, it will be understood that various changes in form and detail may be made therein without departing from the spirit, and scope of the invention.

What is claimed is:

1. A method for making a phone call, the method comprising the steps of:
   providing a workstation equipped with a softphone and with wireless communication means;
   establishing a direct, local wireless connection between said softphone and a mobile phone, said mobile phone and said softphone using said wireless communication means to communicate directly and locally together without using services of a wireless network;
   placing a phone call using call placing functionality of the soft phone to place the phone call;
   using said mobile phone as a handset for said phone call by transferring voice data between said soft phone and said mobile phone through said established wireless connection.

2. The method according to claim 1 wherein said wireless communication means are provided by short range wireless communication means.

3. The method according to claim 2 wherein said wireless communication means are provided by Bluetooth wireless technology.

4. The method according to claim 1 wherein said mobile phone is associated with a home softphone, said method comprising the step of: storing a number of said home softphone.

5. The method according to claim 4 wherein said step of acting as handset for said softphone using said established wireless connection, further comprises the step of: sending a dialing message to said softphone through said wireless connection established with said softphone, said message including said number of said home softphone associated with said mobile phone, and a number of said called phone.

6. The method according to claim 5 wherein said step of acting as a handset for said softphone using said established wireless connection further comprises the step of: acting as a handset for incoming calls intended for said home softphone associated with said mobile phone.

7. The method according to claim 6 wherein said softphone is an Internet Protocol (IP) softphone.

8. The method according to claim 7, wherein said step of establishing a direct wireless connection with said softphone, further comprises the step of: transmitting to said softphone said number of said home softphone previously stored.

9. The method according to claim 8, further comprising the steps of: searching for reestablishment of a direct wireless connection with said softphone or another softphone if said wireless connection with said softphone is lost and if one of said softphones is detected; establishing a direct wireless connection with said detected softphone; transmitting to said detected softphone, said number of said home softphone associated with said mobile phone; and acting as handset for said detected softphone using said wireless connection means.

10. The method according to claim 9 wherein said step of acting as handset for said detected softphone, further comprises the step of: acting as a handset for any incoming calls received by said detected softphone and intended for said home softphone associated with said mobile phone.

11. The method according to claim 10 wherein said mobile phone is also connected to a conventional wireless network.

12. A mobile phone comprising means adapted for carrying out said method according to claim 11.

13. A computer program comprising instructions for carrying out said method according to claim 1 when said computer program is executed in said mobile phone.

14. A method for making a phone call, the method comprising the steps of:
   providing a workstation equipped with a softphone and with wireless communication means;
   establishing a direct and local wireless connection between a mobile phone and said softphone, said mobile phone and said softphone using said wireless communication means to communicate directly and locally together;
   placing a phone call using call placing functionality of the softphone to place the phone call; and
   using said mobile phone as a handset for said softphone by transferring voice data over said established wireless connection
   wherein the placing step comprises the following substeps;
      setting, by the softphone, the outgoing number to which the phone call is to be placed;
      performing, by the softphone, a call setup so that a ringing signal occurs at a telephone of a called party who receives the phone call.

15. The method according to claim 14 wherein said wireless communication means are provided by short range wireless communication means.

16. The method according to claim 15 wherein said wireless communication means are provided by Bluetooth wireless technology.

17. The method according to claim 16 wherein said softphone is an Internet Protocol (IP) softphone.

18. The method according to claims 17, wherein said softphone has a phone number and is connected to a softswitch through an Internet Protocol (IP) network.

19. The method according to claim 18, wherein said step of establishing said direct wireless connection with said mobile phone, further comprises the steps of: receiving from said mobile phone a number of a home softphone, said mobile phone being associated with said home softphone; storing said number of said home softphone.

20. The method according to claims 19, wherein said step of establishing a direct wireless connection with said mobile phone, further comprises the steps of: comparing said home softphone number with said softphone number and if said number of said home softphone and said number of said softphone are different; sending to said softswitch said number of the home softphone associated with said mobile phone and said number of the softphone, in order to redirect calls to said softphone where said wireless connection is established.

21. The method according to claim 20, wherein said step of using said mobile phone as said handset, further comprises the steps of: receiving a call; identifying from said call, the number of said home softphone; identifying said mobile phone connected to said softphone, and associated with said identified home softphone; and using said identified mobile phone as said handset with said established wireless connection.

22. The method according to claim 21, further comprising the step of: if the direct wireless connection with said mobile phone is lost, sending a message to said softswitch for directing incoming calls intended to for said home softphone associated with said mobile phone to either a voice mail, or a pre-determined softphone.

23. The method according to claim 22, wherein said step of using said mobile phone as said handset, further comprises the steps of: receiving a dialing message sent by said mobile phone through said wireless connection established with said mobile phone; said message comprising: the number of said home softphone associated with said mobile phone; a number of a phone to call; if said number of said home softphone associated with said mobile phone and the number of said softphone are the same then calling said phone corresponding to said phone number sent by said mobile phone and using said mobile phone as handset; and if the number of said home softphone associated with said mobile phone and said number of the softphone are different, asking said softswitch to replace in the call, the number of said softphone with said number of said home softphone of said mobile phone, calling said phone corresponding to said phone number sent by said mobile phone, and using said mobile phone as handset.

24. A softphone comprising means adapted for carrying out said method according to claim 23.

25. A computer program comprising instructions for carrying out said method according to claim 14 when said computer program is executed by a softphone.

26. A method for use in a softphone, comprising the steps of:
    establishing a direct and local wireless connection with said mobile phone,
    wherein said mobile phone and said softphone comprise wireless means to communicate directly and locally together; and
    using said mobile phone as a handset with said established wireless connection;
    wherein said softphone is an Internet Protocol (IP) softphone;
    wherein said softphone has a phone number and is connected to a softswitch through an IP network;
    wherein the step of establishing said direct wireless connection comprises:
        (i) receiving from said mobile phone a number of a home softphone, said mobile phone being associated with said home softphone;
        (ii) storing said number of said home softphone; and
        (iii) comparing said home softphone number with said softphone number and if said number of said home softphone and said number of said softphone are different;
        (iv) sending to said softswitch said number of the home softphone associated with said mobile phone and said number of the softphone, in order to redirect calls to said softphone where said wireless connection is established.

27. The method according to claim 26, wherein said step of using said mobile phone as said handset, further comprises the steps of:
    receiving a call;
    identifying from said call, the number of said home softphone; identifying said mobile phone connected to said softphone, and associated with said identified home softphone; and
    using said identified mobile phone as said handset with said established wireless connection.

28. The method according to claim 27, further comprising the step of:
    if the direct wireless connection with said mobile phone is lost, sending a message to said softswitch for directing incoming calls intended to for said home softphone associated with said mobile phone to either a voice mail, or a pre-determined softphone.

29. The method according to claim 28, wherein said step of using said mobile phone as said handset, further comprises the steps of:
    receiving a dialing message sent by said mobile phone through said wireless connection established with said mobile phone;
    said message comprising:
        (i) the number of said home softphone associated with said mobile phone;
        (ii) a number of a phone to call;
    if said number of said home softphone associated with said mobile phone and the number of said softphone are the same then calling said phone corresponding to said phone number sent by said mobile phone and using said mobile phone as handset; and if the number of said home softphone associated with said mobile phone and said number of the softphone are different, asking said softswitch to replace in the call, the number of said softphone with said number of said home softphone of said mobile phone, calling said phone corresponding to said phone number sent by said mobile phone, and using said mobile phone as handset.

30. A softphone comprising means adapted for carrying out said method according to claim 29.

* * * * *